Dec. 2, 1930. J. D. CUMMINGS 1,783,282
ATTACHMENT FOR TRACTORS
Filed June 13, 1927  2 Sheets-Sheet 1
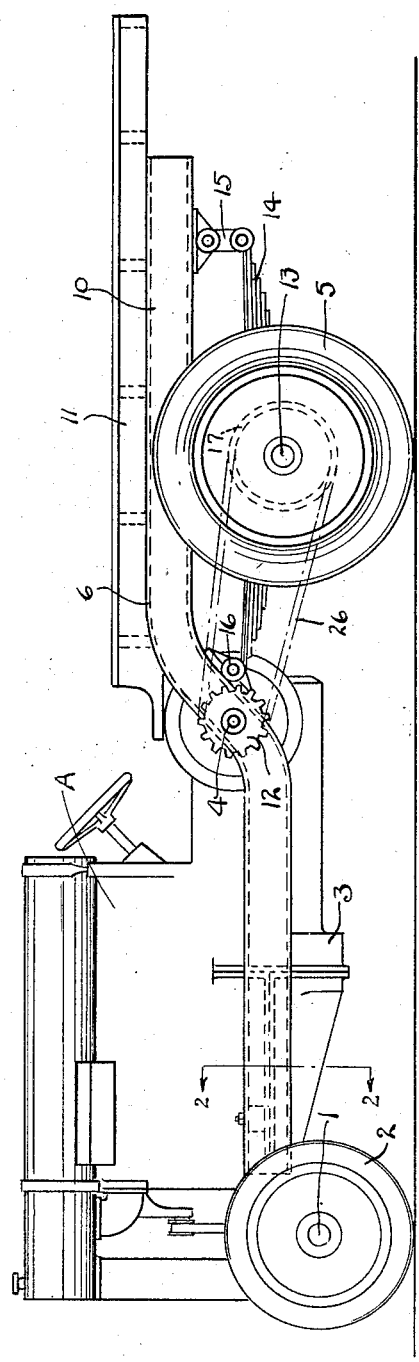
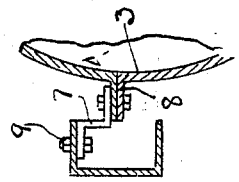
James D. Cummings Inventor
By Jesse R. Stone
Attorney Dec. 2, 1930. J. D. CUMMINGS 1,783,282
ATTACHMENT FOR TRACTORS
Filed June 13, 1927 2 Sheets-Sheet 2
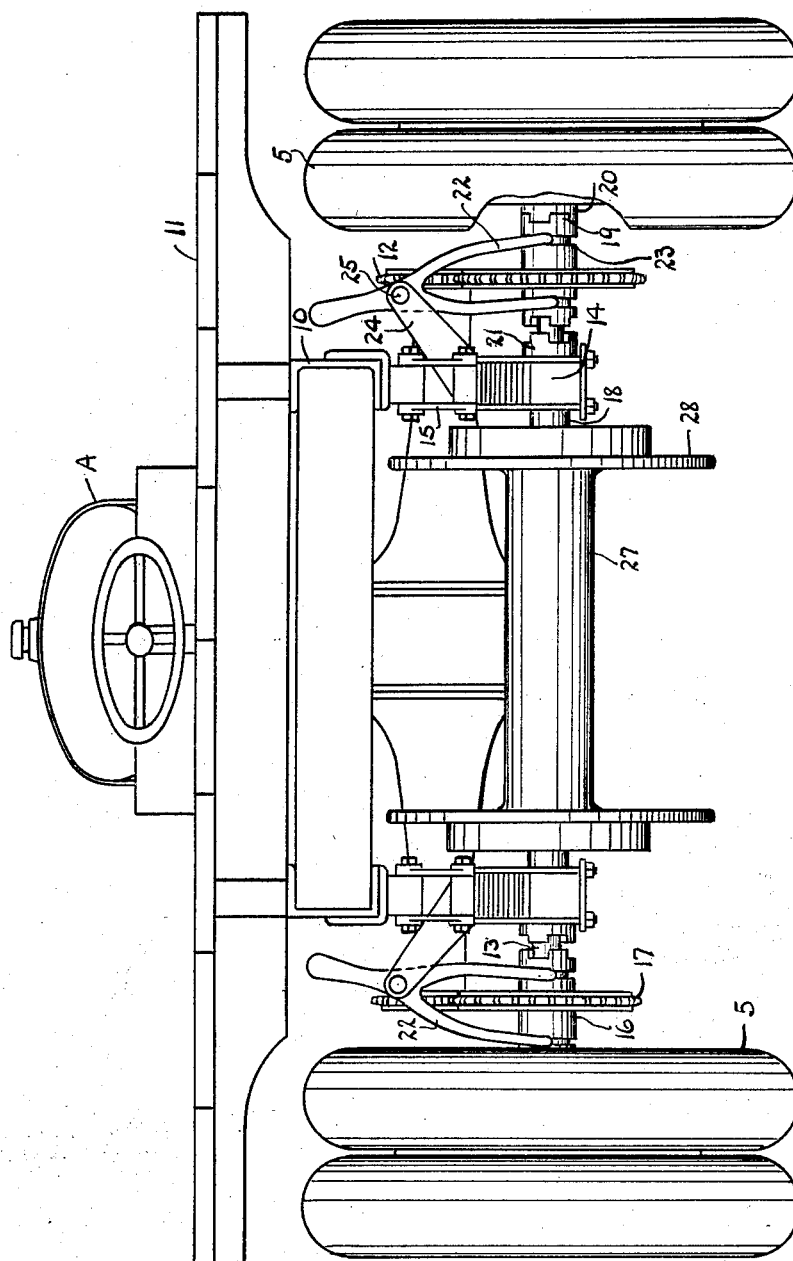

Patented Dec. 2, 1930

1,783,282

UNITED STATES PATENT OFFICE

JAMES D. CUMMINGS, OF HOUSTON, TEXAS

ATTACHMENT FOR TRACTORS

Application filed June 13, 1927. Serial No. 198,374.

My invention relates to tractors and particularly an attachment for tractors of ordinary construction, by means of which the tractor is combined with a truck platform and a hoisting attachment therefor.

The ordinary tractor as now constructed is adapted particularly for pulling operations only, it being contemplated that a truck or some operated vehicle be attached to the tractor for transportation.

It is an object of my invention to provide an attachment for a simple form of tractor device enabling the tractor to perform the services of a truck, so that loads may be carried directly through the tractor and the attachment combined therewith.

It is a further object to provide in connection with the attachment, a hoisting device enabling the use of the tractor for hoisting and pulling operations.

It is also desired that the hoisting device be arranged to enable the tractor to pull itself out of any rut or hole in the road in which it may become stuck.

The invention resides particularly in the construction of the attachment and its arrangement upon the tractor, whereby the tractor, is converted into a load carrying vehicle with means thereon for hoisting or pulling.

Referring to the drawing herewith, Fig. 1 is a side elevation of a tractor with my attachment thereon. Fig. 2 is a broken section taken approximately on the line 2—2 of Fig. 1. Fig. 3 is a rear elevation of the tractor with my invention thereon.

In carrying out my purpose of providing an extension upon the tractor whereby loads may be carried directly by the tractor extension, I contemplate providing a platform arranged upon a framework which may be attached rigidly to the body of the tractor and supported upon the original wheels of the tractor as it is now sold in the market.

With special reference to Fig. 1, I have shown a tractor indicated at A. The tractor employed may be of any ordinary type having a forward axle 1, upon which are mounted wheels 2 at the forward end thereof. The lower part of the tractor includes a crank case 3, and attached to the rearward end of the tractor frame is a rear axle assembly 4, which includes the usual differential and housing. It is to be understood that the said rear axle is adapted to be operated by mechanism within the tractor, the particular construction of this mechanism forms no part of my invention.

I contemplate removing the rear wheels 5 from the axle 4 and using said wheel as one of the supporting members for my attachment. Said attachment includes two side beams or frame members 6 of heavy channel iron construction, the forward end of which is supported upon brackets 7 secured upon the side of flange 8 of the crank case 3, as shown in Fig. 2. The bracket 7 furnishes a support for the upper web of the channel iron and is secured thereto by bolts 9, thus making a firm and rigid support for the forward end of the frame. The frame members 6 are curved upwardly and attached to axle 4, and are then extended rearwardly at 10 to support a platform 11.

The axle 4 which originally supported the rear wheels is extended through the frame members 6 and a sprocket wheel 12 is mounted upon each end of the said shafts or axle to be operated by the mechanism within the tractor.

To support the rear end of the vehicle, I provide a supplementary rear axle 13 which is formed to receive the wheels 5 removed from the axle 4. Upon the rear axle 13 thus provided, I support the rear end of the frame members 6 through the intervention of springs 14 supported centrally upon the axle 13 and connected with the frame members 6 through shackles 15 and 16.

Between the spring members 14 and the wheels 5 upon the shaft 13, I mount a sleeve 16 having thereon a sprocket 17. It is to be understood that there are two of the sleeves 16 with the sprocket wheels thereon, one at each end of the axle and spaced between the supporting spring and the wheels. The sleeves 16 are idle upon the axle but either may be moved into engagement with the wheels of the tractor or with a sleeve 18 upon the axle. Each sleeve 16 is therefore provided at each end thereof with teeth 19 adapted to engage with the teeth 20 upon the wheels at one end, or with the teeth 21 upon the sleeve 18 at the other end. In this manner rotation may be communicated from the sleeve to drive the vehicle or to rotate the sleeve 18. The sleeve 16 therefore forms a clutch to engage with either of the two operated members. It is adapted to be moved into engagement with either of the operated members by means of a forked clutch lever 22 engaging within grooves 23 in the sleeve 16. Such clutch lever is fulcrumed upon a pin 25 supported within a bracket 24 mounted upon the frame of the car.

The sprocket wheels 17 are connected for operation with the sprocket wheels 12 on the shaft 4 through a chain 26, and it is to be understood that the control of the operation of the shaft 4 is through the usual transmission ordinarily employed upon tractors whereby the direction and speed of rotation may be controlled in the usual manner.

Mounted upon the sleeve 18 upon the shaft 13 is a hoisting drum 27 of the usual spool shaped construction, having a cylindrical drum upon which a cable may be reeled through the rotation thereof, said drum having a radial flange 28 at each end thereof. It will be seen that the drum may be rotated in either direction through the connection of the sleeve with the operating sleeve as previously described.

It will be seen that I have provided an attachment which may be mounted upon a tractor of ordinary construction with very little change in the tractor. The attachment makes it possible to provide a platform upon which a load may be carried, said platform being an integral part of the tractor, and it further provides a hoisting or pulling device which may be employed whenever necessary. It is contemplated that the winch or hoisting drum will be employed for the raising or pulling of loads relative to the tractor when desired, but a further and important use for the winch lies in the fact that it enables the operator of the tractor to pull the vehicle out of the mud hole or similar situation in which the vehicle may become stalled. Thus when the wheels of the vehicle may become lodged in a mudhole from which the operation of the wheels can not propel the vehicle, it is then possible to wind the cable about the drum 27 and extend the cable either forwardly or rearwardly relative to the tractor and anchor the cable to some stationary object, such as a post or a tree, then by reeling up the cable upon the drum the vehicle may be moved from the place in which it is anchored. It enables the driver of the car to extricate himself from a position from which he might otherwise be released only by the assistance of some other source of power, such as a tractor or a team of horses.

There are many advantages in a vehicle of this type residing in the details of its construction as have been set forth. It is believed that these advantages will be clear to those skilled in the art without further description.

What I claim as new and desire to protect by Letters Patent is:

1. In a tractor having a crank case, front and rear axles, and means to drive said rear axle; the combination of longitudinal frame mambers, means on said crank case to support the forward ends of said members, a supplemental axle, drive wheels thereon, means on said supplemental axle to support the rearward ends of said frame members, said rear axle being supported in said frame, a sleeve rotatable on said supplemental axle, a plurality of operative means for connecting said rear axle and said sleeve, and means to engage either of said operative means with said drive wheels.

2. In a tractor having a crank case, front and rear axles, and means to drive said rear axle; the combination of longitudinal frame members, means on said crank case to support the forward ends of said members, a supplemental axle, drive wheels thereon, means on said supplemental axle to support the rearward ends of said frame members, said rear axle being supported in said frame, a reel on said supplemental axle, operating means driven from said rear axle, and means to selectively engage said operating means with either or both of said drive wheels or said drum.

3. In a tractor having a crank case, and front axles upon which said crank case is supported, a pair of the side frame members supported upon said crank case at their forward ends, said frame members being curved upwardly between their ends, a rear shaft having driving wheels and a hoisting drum thereon, and furnishing a support for the rear ends of said frame members, a stub shaft journalled in said frame at the said curved portion, and means operated from said tractor to drive said stub shaft and said wheels or said drum in either direction as desired.

4. An attachment for tractors including a pair of frame members adapted for attachment at one end to the crank case of the tractor, an axle and a pair of wheels to support the opposite end, means to journal the rear axle of the tractor in said frame members, a reel loosely mounted on said attachment axle, and independent means driven by either end of the tractor axle to selectively drive either said reel or said wheels.

5. An attachment for tractors including a pair of frame members adapted for attachment at one end to the crank case of the tractor, an axle and a pair of wheels to support the opposite end, means to journal the rear axle of the tractor in said frame members, a reel loosely mounted on said attachment axle, and independent means driven by either end of the tractor axle to selectively drive either said reel or said wheels, said last means being arranged so that both said reel and said wheels may be driven simultaneously.

In testimony whereof I hereunto affix my signature this 9th day of June A. D. 1927.

JAMES D. CUMMINGS.